(12) United States Patent
Sakamoto et al.

(10) Patent No.: US 9,799,211 B2
(45) Date of Patent: Oct. 24, 2017

(54) EQUIPMENT CONTROL DEVICE, EQUIPMENT CONTROL METHOD, AND PROGRAM

(71) Applicant: Mitsubishi Electric Corporation, Tokyo (JP)

(72) Inventors: Tadaaki Sakamoto, Tokyo (JP); Masayuki Komatsu, Tokyo (JP); Shinji Nakamura, Tokyo (JP); Satoshi Minezawa, Tokyo (JP); Yuki Ogawa, Tokyo (JP); Shiro Suzuki, Tokyo (JP); Masaaki Yabe, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 27 days.

(21) Appl. No.: 14/423,244

(22) PCT Filed: Aug. 30, 2013

(86) PCT No.: PCT/JP2013/073331
§ 371 (c)(1),
(2) Date: Feb. 23, 2015

(87) PCT Pub. No.: WO2014/034853
PCT Pub. Date: Mar. 6, 2014

(65) Prior Publication Data
US 2015/0221212 A1 Aug. 6, 2015

(30) Foreign Application Priority Data

Aug. 30, 2012 (JP) ................................. 2012-189404
Dec. 10, 2012 (JP) ................................. 2012-269691

(51) Int. Cl.
*G08C 17/02* (2006.01)
*H04Q 9/00* (2006.01)
(Continued)

(52) U.S. Cl.
CPC ............. *G08C 17/02* (2013.01); *G08C 17/00* (2013.01); *H04L 12/2818* (2013.01);
(Continued)

(58) Field of Classification Search
CPC ........... G08C 17/02; H04Q 9/00; G08B 25/00
(Continued)

(56) References Cited

U.S. PATENT DOCUMENTS 6,570,524 B1 * 5/2003 Mullaly ................. G08C 23/04
340/12.22
7,756,574 B2 * 7/2010 Araki ..................... G06F 3/011
600/544

(Continued)

FOREIGN PATENT DOCUMENTS

JP 06-076187 A 3/1994
JP 2004-135040 A 4/2004
(Continued)

OTHER PUBLICATIONS

Extended European Search Report dated Apr. 25, 2016 issued in the corresponding EP patent application No. 13833337.2-1853.
(Continued)

*Primary Examiner* — Nam V Nguyen
(74) *Attorney, Agent, or Firm* — Posz Law Group, PLC

(57) ABSTRACT

A control signal receiver of an equipment control device receives a control signal for equipment transmitted by a remote control terminal from a communication device via the Internet. A remote control authorization receiver receives, from a resident of a home, an authorization with respect to the control signal received by the control signal receiver. When the authorization receiver receives an authorization from the resident of the home, an equipment controller controls the equipment on the basis of the received control signal.

9 Claims, 11 Drawing Sheets

(51) Int. Cl.
*G08B 25/00* (2006.01)
*G08C 19/12* (2006.01)
*H04L 17/02* (2006.01)
*H04L 12/28* (2006.01)
*G08C 17/00* (2006.01)
*H04L 29/06* (2006.01)

(52) U.S. Cl.
CPC .......... *H04L 63/10* (2013.01); *G08C 2201/42* (2013.01); *H04L 63/12* (2013.01)

(58) Field of Classification Search
USPC ................. 340/5.6, 5.61; 341/176; 726/4
See application file for complete search history.

(56) References Cited

U.S. PATENT DOCUMENTS

2012/0207445 A1   8/2012   Thomas et al.
2012/0309381 A1*  12/2012  Almeda ................. G08C 23/04
                                                 455/420
2015/0180880 A1*  6/2015   Nakano ................. G08C 17/02
                                                 726/4

FOREIGN PATENT DOCUMENTS

JP   2008-035435 A   2/2008
JP   2012-003491 A   1/2012

OTHER PUBLICATIONS

International Search Report of the International Searching Authority dated Nov. 9, 2013 for the corresponding international application No. PCT/JP2013/073331 (and English translation).
Office Action dated May 20, 2014 in corresponding JP Application No. 2012-269691 (and English translation).
Office Action dated Aug. 1, 2017 issued in corresponding CN patent application No. 201380044776.7 (and partial English translation).

\* cited by examiner

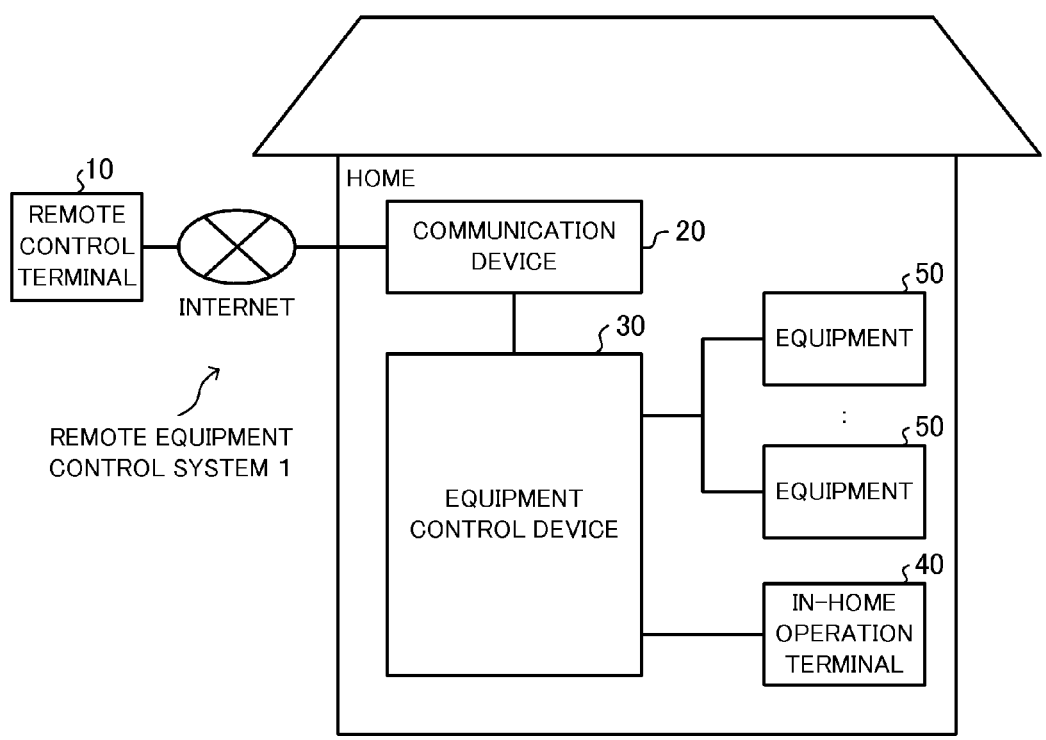

FIG. 4

REMOTE CONTROL
AUTHORIZATION

TURN WATER HEATER POWER
SOURCE ON

| AUTHORIZE | DO NOT AUTHORIZE |

FIG. 7

AUTHORIZATION NECESSITY INFORMATION

| CONTROL TARGET EQUIPMENT | CONTROL CONTENTS | AUTHORIZATION NECESSITY FLAG |
|---|---|---|
| HOME SECURITY SYSTEM | POWER SOURCE ON | AUTHORIZATION UNNECESSARY |
| | POWER SOURCE OFF | AUTHORIZATION NECESSARY |
| WATER HEATER | POWER SOURCE ON | AUTHORIZATION NECESSARY |
| | POWER SOURCE OFF | AUTHORIZATION UNNECESSARY |
| LIGHTING | ALL | AUTHORIZATION UNNECESSARY |
| TV RECORDER | ALL | AUTHORIZATION UNNECESSARY |
| ⋮ | ⋮ | ⋮ |

FIG. 10

CONTROL SIGNAL

| HEADER INFORMATION | REMOTE CONTROL TERMINAL ID | EQUIPMENT ID | CONTROL CONTENT INFORMATION | AUTHORIZED PERSON ID | ... |
|---|---|---|---|---|---|

FIG. 11

AUTHORIZED PERSON TABLE

| AUTHORIZED PERSON ID | CODE NUMBER |
|---|---|
| 001 | * * * * |
| 002 | * * * * |
| 003 | * * * * |
| ... | ... |

EQUIPMENT CONTROL DEVICE, EQUIPMENT CONTROL METHOD, AND PROGRAM

CROSS REFERENCE TO RELATED APPLICATION

This application is a U.S. national stage application of International Application No. PCT/JP2013/073331 filed on Aug. 30, 2013, which claims priority to Japanese Patent Application No. 2012-189404, filed on Aug. 30, 2012 and Japanese Patent Application No. 2012-269691, filed on Dec. 10, 2012, the disclosures of which are incorporated herein by reference.

TECHNICAL FIELD

The present disclosure relates generally to an equipment control device, an equipment control method and a program, for controlling equipment in a home.

BACKGROUND ART

As disclosed in Patent Literature 1, technology for remotely controlling various equipment inside a home using a mobile phone and/or the like possessed by a user has been known. With this technology, it is possible for a user away from home, for example, to remotely control a television recorder in the home and reschedule recording of a television program or to activate an air conditioner by remote control prior to returning home so that the room is in a comfortable state upon arrival, and/or the like, thereby making it possible to improve convenience.

CITATION LIST

Patent Literature

Patent Literature 1: Unexamined Japanese Patent Application Kokai Publication No. 2004-135040.

SUMMARY OF INVENTION

Technical Problem

However, when remotely controlling equipment, conditions surrounding the equipment being operated are unclear to the user. Accordingly, there are concerns that equipment such as an electric stove and/or the like could be activated despite highly flammable materials being in the surroundings.

In addition, in Patent Literature 1, in the case of equipment such as gas water heaters it is disclosed that safety is assured by enabling remote control only for stopping the main power source. However, if remote control is made possible only for stopping the main power source uniformly, depending on the conditions surrounding the equipment, there could be cases in which activating the equipment by remote control would also be good, creating the problem that convenience declines.

In consideration of the foregoing, it is an objective of the present disclosure to provide an equipment control device, equipment control method and program with which remote control of equipment is possible with greater safety without losing convenience.

Solution to Problem

To achieve the above objective, the equipment control device according to the present disclosure comprises:
control signal receiving means for receiving a control signal for controlling equipment in a home from a remote control terminal, via a network;
authorization receiving means for receiving authorization from a resident, for control indicated by the control signal received; and
equipment control means for controlling equipment based on the control signal received, when the authorization receiving means has received authorization from the resident.

Advantageous Effects of Invention

With the present disclosure, out of control indicated from a remote control terminal, only control for which authorization has been received from a resident is executed. In accordance, it is possible to remotely control equipment with greater safety without losing convenience.

BRIEF DESCRIPTION OF DRAWINGS

FIG. 1 is a drawing showing the composition of a remote control system according to a first exemplary embodiment of the present disclosure;

FIG. 2 is a drawing showing an example of a control signal;

FIG. 4 is a drawing showing an example of a remote control authorization screen;

FIG. 7 is a drawing showing an example of authorization necessity information;

FIG. 10 is a drawing showing an example of a control signal;

FIG. 11 is a drawing showing an example of the composition of an authorized person table;

DESCRIPTION OF EMBODIMENTS

Figure 3:
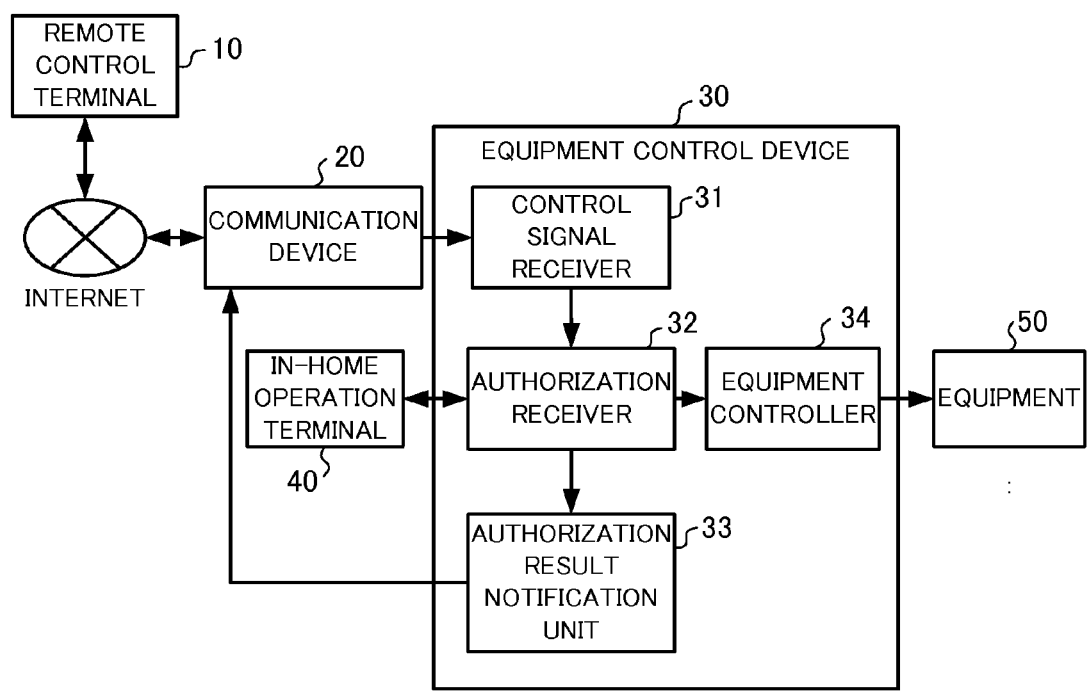
FIG. 3 is a block diagram showing the composition of an equipment control device according to the first exemplary embodiment of the present disclosure.

The exemplary embodiments of the present disclosure are explained in detail below with reference to the drawings. Components that are the same or corresponding in the drawings are labeled with the same reference symbols.

<First exemplary embodiment>

A remote equipment control system 1 according to a first exemplary embodiment of the present disclosure will now be described. The remote equipment control system 1 is a system for remotely controlling various equipment 50 such as a water heater, an air conditioner and/or the like in a user's home, via the Internet. The remote equipment control system 1 comprises a remote control terminal 10, a communication device 20, an equipment control device 30 and an in-home operation terminal 40, as shown in FIG. 1.

The remote control terminal 10 is a tablet terminal, mobile phone, smartphone and/or the like having Internet connection capabilities, for example. The remote control terminal 10 sends a control signal for controlling the various equipment 50 to the equipment control device 30 in accordance with commands from the user.

The control signal is a signal including header information indicating that the signal is a remote control signal, the ID of the remote control terminal 10 that is the transmitter, the ID of the equipment that is the control target, information indicating the contents of control (control content information) and/or the like, as shown in FIG. 2. The control content information is, for example, information indicating "turn the water heater on/off" or "increase the set temperature of the air conditioner one degree."

Returning to FIG. 1, the communication equipment 20 is a router positioned in the user's home, and relays communication between the remote control terminal 10 and the equipment control device 30.

The equipment control device 30 is a controller for controlling the various equipment 50 in the user's home. The equipment control device 30 comprises a CPU (Central Processing Unit), RAM (Random Access Memory), ROM (Read Only Memory), hard disk drive, touch panel, communication interface and/or the like.

The equipment control device 30 functionally comprises a control signal receiver 31, an authorization receiver 32, an authorization result notification unit 33 and an equipment controller 34, as shown in FIG. 3.

The control signal receiver 31 receives control signals for controlling the equipment 50 in the home transmitted from the remote control terminal 10, via the communication device 20.

The authorization receiver 32 comprises a touch panel, and receives from the user in the home (resident) an indication of whether or not control of the equipment 50 that is the target of remote control indicated by the control signal received by the control signal receiver 31 is authorized. Specifically, the authorization receiver 32 displays on the touch panel a remote control authorization screen such as is shown in FIG. 4 in order to receive authorization. Then, the authorization receiver 32 receives an indication of whether or not control is authorized by detecting a touch operation from the resident on the remote control authorization screen. In the remote control authorization screen shown in FIG. 4, text "turn water heater power source on" indicating the content of control is shown. The authorization receiver 32 may create this text based on the control content information included in the control signal received. In addition, the authorization receiver 32 may cause the remote control authorization screen to be displayed on the touch panel of the in-home operation terminal 40.

Returning to FIG. 3, the authorization result notification unit 33 sends information indicating results received by the authorization receiver 32 (information indicating whether or not control is authorized) to the remote control terminal 10 that is the origin of the control signal, via the communication device 20.

The equipment controller 34 controls the equipment 50 based on the control signal received by the control signal receiver 31 when the authorization receiver 32 has received authorization from the resident.

Returning to FIG. 1, the in-home operation terminal 40 is a tablet terminal excelling in portability and equipped with a touch panel, a key button and/or the like. The in-home operation terminal 40 is connected by wires or wirelessly to the equipment control device 30, and functions as an external interface of the equipment control device 30. The range in which the in-home operation terminal 40 can communicate with the equipment control device 30 is within the home, and the in-home operation terminal 40 cannot communicate with the equipment control device 30 from outside the home.

Figure 5:
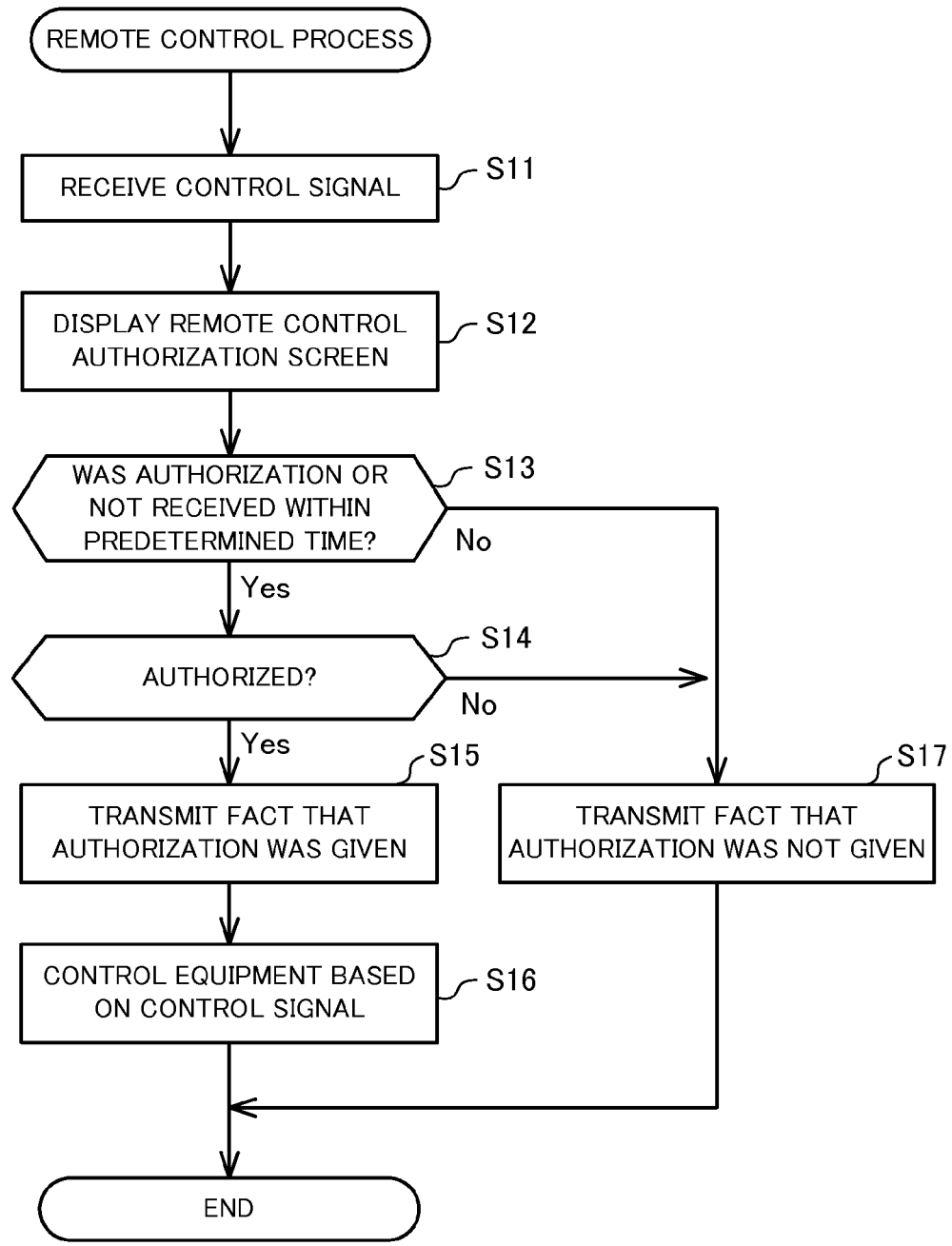
FIG. 5 is a flowchart for explaining the actions of a remote control process according to the first exemplary embodiment.

Next, the actions of a remote control process executed by the equipment control device 30 when remotely controlling the equipment 50 in the home from the remote control terminal 10 is described with reference to the flowchart in FIG. 5.

When away from home, the user operates the remote control terminal 10 and commands remote control of the equipment 50 in the home. The remote control terminal 10 sends a control signal corresponding to the command to the communication device 20 in the home via the Internet. The communication device 20, upon receiving the control signal from the remote control terminal 10, sends the control signal to the equipment control device 30 after accomplishing a process authenticating the user.

When the control signal receiver 31 of the equipment control device 30 receives a control signal from the communication device 20 (step S11), the authorization receiver 32 displays on the touch panel a remote control authorization screen for receiving authorization of control indicated by the control signal (step S12). At this time, the authorization receiver 32 may output a specified sound to an unrepresented speaker, cause an unrepresented LED to flash, and/or the like, thereby providing notification of the display on the remote control authorization screen.

When there is a user (resident) in the home, the resident confirms the contents of the displayed remote control authorization screen, determines whether or not to authorize control and touches a corresponding area of the screen, within a predetermined time (for example, within five minutes). By detecting the area touched, the authorization receiver 32 receives an indication of whether or not control is authorized (step S13: Yes).

For example, if a remote control authorization screen such as that shown in FIG. 4 is displayed and the status is such that the water heater can safely be turned on, the resident may touch "authorize." In addition, in a case in which flammable materials are around the water heater, the resident may touch "not authorize."

Next, when the authorization receiver 32 has received authorization for control from the resident (step S14: Yes), the authorization result notification unit 33 sends to the remote control terminal 10 that is the transmission source of the control signal an email and/or the like to the effect that control was authorized (step S15). Furthermore, the equipment controller 34 controls the corresponding equipment 50 based on the control signal received by the control signal receiver 31 (step S16).

In addition, when no person is in the home due to being away and an operation is not done by the resident within the predetermined time after the remote control authorization screen is displayed (step S13: No), or when the authorization receiver 32 has received an indication that control is not authorized from the resident (step S14: No), there is a possibility that controlling the equipment 50 based on the control signal would be dangerous. Accordingly, in such a case the equipment controller 34 does not control the equipment 50 and the authorization result notification unit 33 sends to the remote control terminal 10 that is the transmission source of the control signal an email and/or the like to the effect that control was not authorized (step S17). With this, the remote control process concludes.

In this manner, with the first exemplary embodiment of the present disclosure, when the equipment 50 in the home is remotely controlled from the remote control terminal 10, such control is not executed if authorization from the resident is not received. Accordingly, it is possible to safely control the equipment 50 remotely without losing convenience, and without part of control of the equipment being prevented from being remotely control as in the invention disclosed in Patent Literature 1.

In addition, with the first exemplary embodiment of the present disclosure, information indicating the results of whether or not the resident gave authorization (authorization result information) for control of the equipment 50 commanded by the remote control terminal 10 is sent to the remote control terminal 10. Accordingly, the user that commanded remote control can confirm whether or not the commanded control was actually executed.

In addition, with the first exemplary embodiment of the present disclosure, a remote control authorization screen for receiving authorization from the resident is displayed on the touch panel. In addition, on this remote control authorization screen, control content indicated by the control signal received is also displayed. Accordingly, it is possible for the user to easily command authorization or non-authorization of control from the remote control authorization screen.

<Second exemplary embodiment>

In the first exemplary embodiment, control was executed from the remote control terminal 10 for all of the equipment 50 in the home to the extent that authorization was received from the resident. Consequently, authorization from the resident was necessary for remote control even for equipment 50 for which there are no impediments in terms of safety even without authorization from the resident, such as a television recorder or lighting. With the second exemplary embodiment, convenience is improved further by enabling remote control even without authorization from the resident for this kind of equipment 50.

Figure 6:
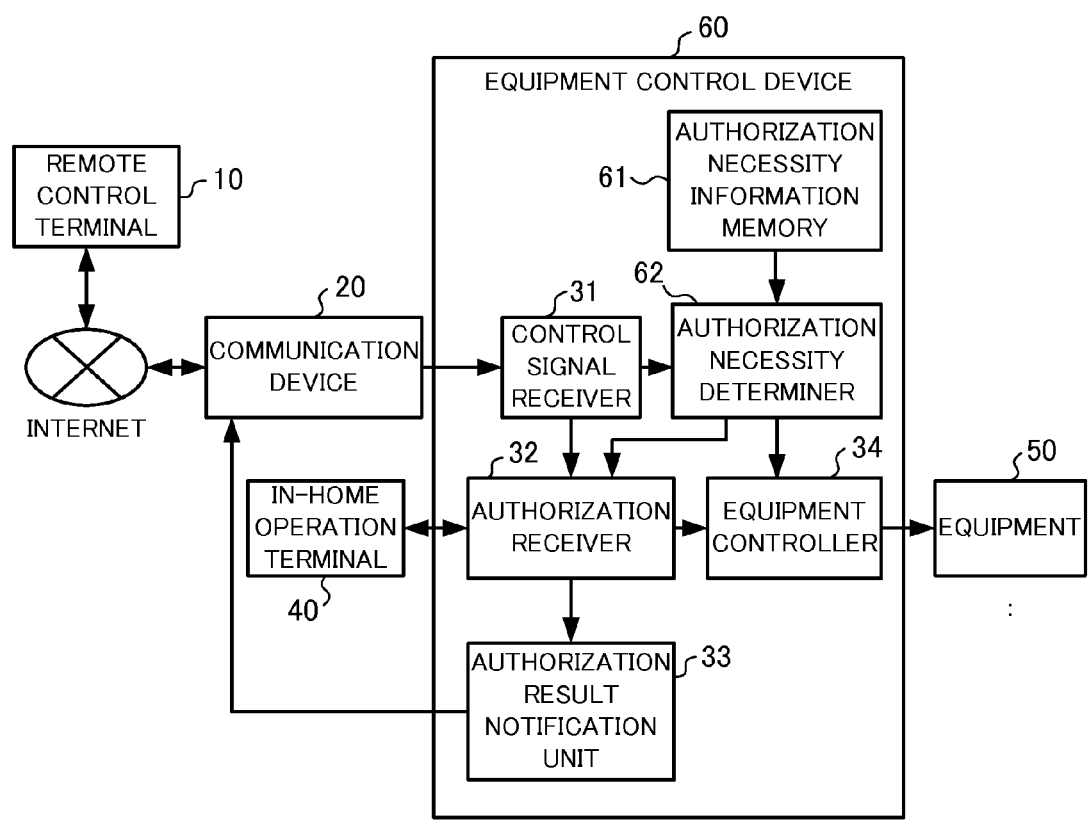
FIG. 6 is a block diagram showing the composition of an equipment control device according to a second exemplary embodiment of the present disclosure.

The composition of an equipment control device 60 according to the second exemplary embodiment of the present disclosure is shown in FIG. 6. In contrast with the equipment control device 30 according to the first exemplary embodiment, the equipment control device 60 further comprises an authorization necessity information memory 61 and an authorization necessity determiner 62.

As shown in FIG. 7, the authorization necessity information memory 61 stores authorization necessity information in which types of control of the equipment 50 (control target equipment, control contents) and an authorization necessity flag indicating whether or not control requires authorization from the resident are associated with each other. The authorization necessity flag can be freely set by the user.

The authorization necessity determiner 62 determines whether or not authorization from the resident is necessary for the control indicated by the control information received by the control signal receiver 31, with reference to the authorization necessity information stored in the authorization necessity information memory 61.

Figure 8:
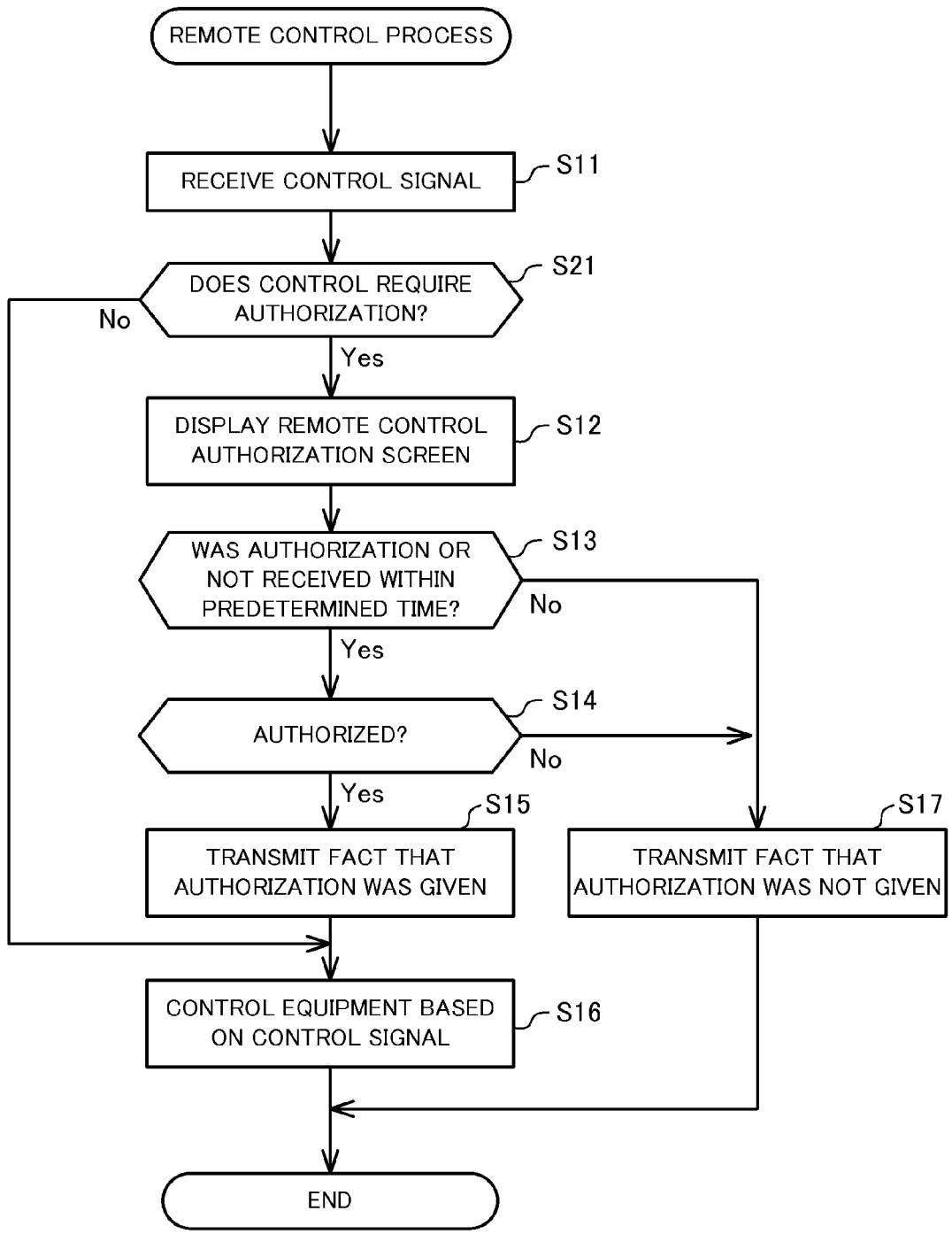
FIG. 8 is a flowchart for explaining the actions of a remote control process according to the second exemplary embodiment.

Next, the actions of a remote control process executed by the equipment control device 60 are described with reference to the flowchart in FIG. 8. Processes with substantially similar content as the remote control process of the equipment control device 30 according to the first exemplary embodiment are labelled with the same step numbers and description is omitted here.

When the control signal receiver 31 of the equipment control device 60 receives a control signal sent from the remote control terminal 10 (step S11), the authorization necessity determiner 62 determines whether or not the control indicated by the control information received requires authorization from the resident, by referencing the authorization necessity information stored in the authorization necessity information memory 61 (step S21).

For example, consider a case in which the authorization necessity information shown in FIG. 7 is stored in the authorization necessity information memory 61. In this case, when the control content indicated by the control information received is "turn water heater power source on", it is determined that authorization is necessary (step S21: Yes). In addition, when the control content indicated by the control information received is "turn water heater power source off", it is determined that authorization is unnecessary (step S21: No).

Returning to FIG. 8, when it is determined that authorization is necessary (step S21: Yes), similar to the first exemplary embodiment the remote control authorization screen is displayed and authorization is received from the resident, and a process to control the equipment 50 is accomplished only when authorization has been received (step S12 to step S17).

In addition, when it is determined that authorization is unnecessary (step S21: No), the equipment controller 34 controls the corresponding equipment 50 based on the control signal received by the control signal receiver 31, without obtaining authorization from the resident (step S16). With this, the remote control process concludes.

In this manner, with the second exemplary embodiment of the present disclosure, it is possible to set whether or not authorization from the resident is necessary in accordance with control contents for the equipment 50, so it is possible to further improve convenience.

<Third exemplary embodiment>

In the first and second exemplary embodiments, it was possible for anyone who is a resident to operate the touch panel and in-home operation terminal 40 and authorize remote control of equipment 50 in the home. Consequently, authorization of remote control was possible even by residents who are unable to adequately confirm the safety of the surroundings, such as small children and/or the like. In the third exemplary embodiment, safety is further improved by restricting the residents who can authorize remote control.

An equipment control device 70 according to the third exemplary embodiment of the present disclosure is described below. The description is for an equipment control device 70 that is the equipment control device 30 according to the first exemplary embodiment to which composition has been added, but an equipment control device 70 that is the equipment control device 60 according to the second exemplary embodiment to which composition has been added is also included within this exemplary embodiment.

Figure 9:
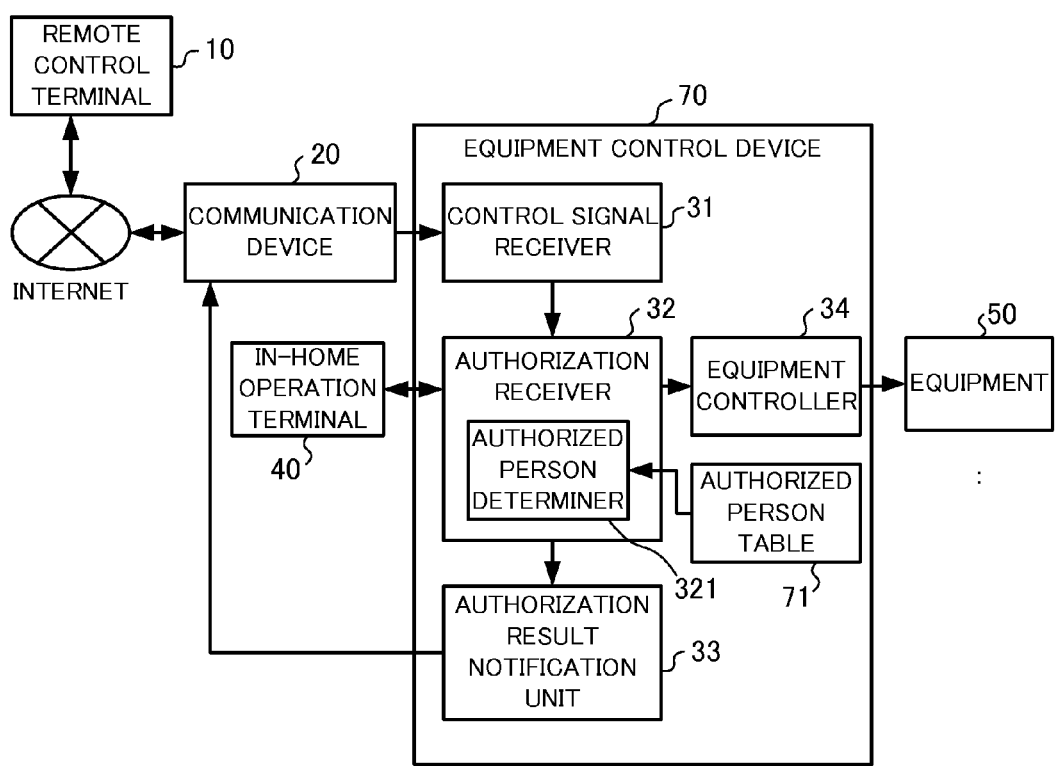
FIG. 9 is a block diagram showing the composition of an equipment control device according to a third exemplary embodiment of the present disclosure.

As shown in FIG. 9, the equipment control device 70, in contrast to the equipment control device 30 according to the first exemplary embodiment, further comprises an authorized person table 71. In addition, the authorization receiver 32 comprises an authorized person determiner 321.

Furthermore, as shown in FIG. 10, in the third exemplary embodiment an authorized person ID is included in the control signal sent form the remote control terminal 10, in contrast to the first and second exemplary embodiments. The authorized person ID is an ID of a resident (authorized person) from which authorization for control of the equipment 50 indicated by the control signal is permitted. The authorized person is preferably an adult (for example, a mother or a father) who can confirm in-home safety. When there are multiple authorized people, multiple authorized person IDs are set in the control signal.

The authorized person table 71 is a table in which a code number (password) and the authorized person ID of the authorized person are stored for each authorized person, as shown in FIG. 11. The authorized person table 71 is set in advance by a supervisor.

Returning to FIG. 9, the authorized person determiner 321 upon receiving a command of authorization or no authorization for control of the equipment 50 references the authorized person table 71 and determines whether that command is from an authorized person. The equipment controller 34 controls the equipment 50 based on the control signal received from the remote control terminal 10 only when the command for authorization received is determined to be from an authorized person.

Figure 12:
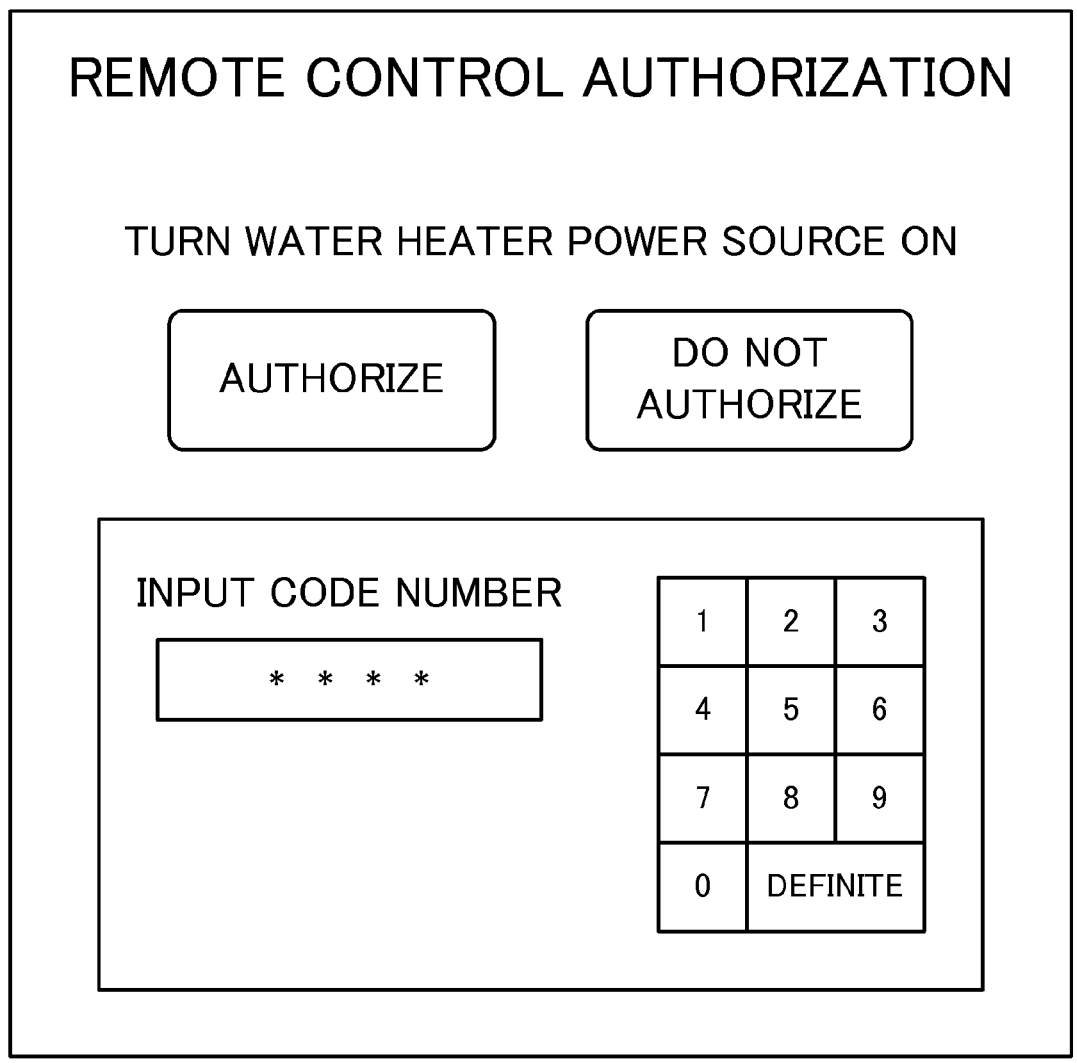
FIG. 12 is a drawing showing an example of a remote control authorization screen.

The method of making the determination of whether or not this is an authorized person with the authorized person determiner 321 will be described in detail. For example, the authorization receiver 32 displays a remote control authorization screen as such as is shown in FIG. 12. With this remote control screen, an area where the code number is input is provided, in addition to the buttons commanding authorization or no authorization of control. The resident, after inputting their own predetermined code number, presses a button for authorizing or not authorizing. In response to this operation, the authorized person determiner 321 refers to the authorized person table 71 and acquires the code number of the authorized person indicated by the authorized person ID included in the control signal received by the control signal receiver 31. Then, the authorized person determiner 321 determines whether or not the resident who received the command for authorization or no authorization is an authorized person, by confirming whether or not the acquired code number and the code number the resident input match.

Figure 13:
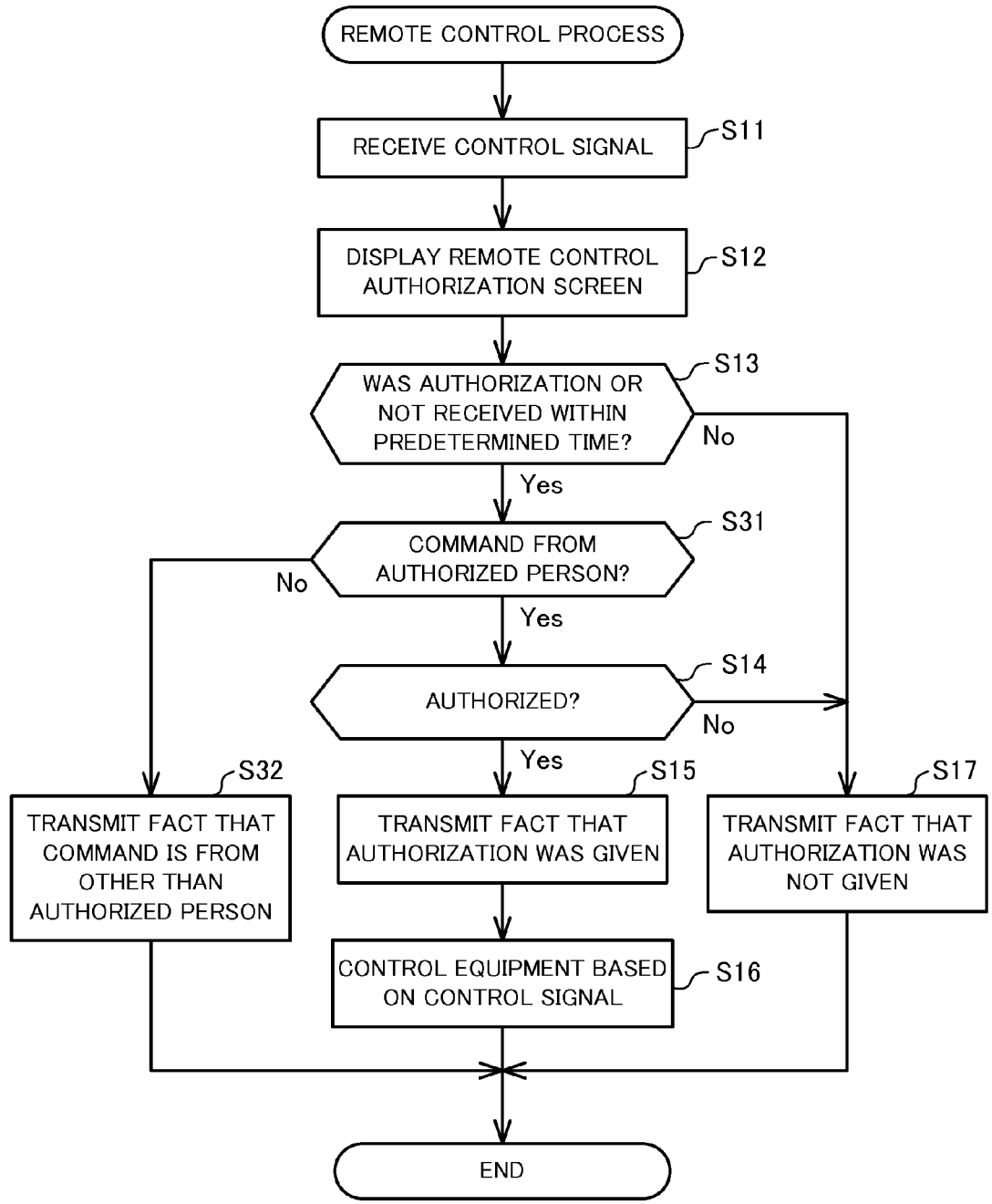
FIG. 13 is a flowchart for explaining the actions of a remote control process according to the third exemplary embodiment.

Next, the actions of the remote control process executed by the equipment control device 70 are explained with reference to the flowchart in FIG. 13. Processes with contents substantially the same as the remote control process of the equipment control device 30 according to the first exemplary embodiment are labeled with the same step numbers and explanation is omitted here.

When away from home, the user operates the remote control terminal 10 and commands remote control of the in-house equipment 50, the remote control terminal 10 sends a control signal corresponding to the command to the in-home communication device 20, and the communication device 20 sends the control signal to the equipment control device 70. The authorized person ID is included in this control signal, as shown in FIG. 10. The authorized person ID included in the control signal may be input by the user by operating the remote control terminal 10 when commanding remote control, or may be an authorized person ID set in advance for each type of control of the equipment 50.

When the control signal receiver 31 of the equipment control device 70 receives the control signal sent from the remote control terminal 10 (step S11), the authorization receiver 32 displays the remote control authorization screen (step S12) and within a predetermined time receives a command for authorization or no authorization of control and input of the code number from the resident (step S13: Yes).

Next, the authorized person determiner 321 determines whether or not the command received in step S12 is from an authorized person (step S31).

When it is determined that the command is not from an authorized person (step S31: No), the authorization result notification unit 33 (non-authorized person notification means) sends an email and/or the like conveying the fact that a resident other than an authorized person has authorized or not authorized control to the remote control terminal 10 that was the origin of the control signal (step S32).

When it is determined that the command is from an authorized person (step S31: Yes), the equipment control device 30 determines whether a command of authorization or non-authorization of control was received from the resident, the same as in the first exemplary embodiment, and when a command of authorization was received, accomplishes the process of controlling the equipment 50 based on the control signal received (step S14 to step S17).

In this manner, with the third exemplary embodiment of the present disclosure, it is possible to remotely control the equipment 50 only when there is authorization from an authorized person set in advance. Accordingly, authorization of control of the equipment 50 does not happen through operation by children and/or the like who are not authorized people, so it is possible to further improve safety.

In addition, with the third exemplary embodiment of the present disclosure, when there is authorization from a resident other than an authorized person for control of the equipment 50, that fact is communicated to the remote control terminal 10. Accordingly, the user commanding remote control can indirectly know that there is a resident such as a child and/or the like in the home.

As shown in FIG. 10, the explanation was that the authorized person ID was included in the control signal for the equipment 50, but this exemplary embodiment can be applied even with a control signal that does not include the authorized person ID. In this case, the authorized person determiner 321 may determine whether or not there is authorization from an authorized person by confirming whether or not the code number input from the remote control authorization screen matches any of the code numbers recorded in the authorized person table 71.

In addition, in the above description, the authorized person determiner 321 determined whether or not the person is authorized using code numbers, but it would be fine to determine authorized people using finger print information, the eye iris, facial features and/or the like. In this case, it is necessary to store biological information about the authorized people, corresponding with authorized person IDs, in the authorized person table 71. In addition, it is necessary for the equipment control device 70 to further comprise a biological information acquirer, such as a camera, a fingerprint reader, and/or the like.

In addition, when an in-home operation terminal 40 is provided to each user in the home and information is given to the equipment control device 70 indicating to whom the in-home operation terminal 40 belongs, the authorized person determiner 321 upon receiving the control signal may display a remote control authorization screen only on the in-home operation terminals 40 of authorized people and thereby receive authorization or non-authorization for control. In this case, it is possible to receive authorization for control from only an authorized person even without a code number input area as shown in FIG. 12 being provided on the remote control authorization screen, and to similarly improve safety.

The present disclosure is not limited to the above-described exemplary embodiment, for various revisions are possible in areas that do not deviate from the scope of the present disclosure.

For example, with the above-described exemplary embodiments, the remote control terminal 10 and the in-home communication device 20 are connected via the Internet, but it would be fine for these to be connected via a network such as a LAN (Local Area Network), a telephone network and/or the like.

In addition, with the above-described exemplary embodiments, authorization from the resident was received from a remote control authorization screen displayed on the touch panel, but it would be fine for authorization from the resident to be received through an operation such as a key button and/or the like.

In addition, for example by applying an operation program stipulating the operation of the equipment control device 30, 60 or 70 according to the exemplary embodiments to an existing personal computer, information terminal device and/or the like, it is possible to cause the personal computer and/or the like to function as the equipment control device 30, 60 or 70 according to the exemplary embodiments.

In addition, the distribution method of such a program is arbitrary, and it would be fine to store the program on a computer-readable, non-transitory memory medium such as a CD-ROM (Compact Disk Read-Only Memory), DVD (Digital Versatile Disk), MO (Magneto Optical Disk), memory card and/or the like, and it would also be fine to distribute the program via a communication network such as the Internet and/or the like.

This application claims the benefit of Japanese Patent Applications No. 2012-189404 and No. 2012-269691, the entire disclosures of which are incorporated by reference herein.

INDUSTRIAL APPLICABILITY

The present disclosure is appropriately applied to a controller for managing equipment in a home.

REFERENCE SIGNS LIST

1 Remote equipment control system
10 Remote control terminal
20 Communication device
30, 60, 70 Equipment control device
31 Control signal receiver
32 Authorization receiver
321 Authorized person determiner
33 Authorization result notification unit
34 Equipment controller
40 In-home operation terminal
50 Equipment
61 Authorization necessity information memory
62 Authorization necessity determiner
71 Authorized person table

The invention claimed is:

1. An equipment control device comprising:
   a control signal receiver for receiving a control signal for controlling indoor equipment from a remote control terminal, via a network, the control signal including an authorized person identification;
   an authorization receiver for receiving an authorized instruction or a non-authorized instruction from a resident, for control indicated by the control signal received;
   an authorized person determiner for determining whether or not a received instruction is from an authorized person who is a resident and for whom control is authorized in advance;
   an equipment controller for controlling the indoor equipment based on the control signal received, only when the received instruction is the authorized instruction and is from the authorized person;
   an authorization result transmitter for transmitting to the remote control terminal authorization result information indicating content of the received instruction;
   an unauthorized person notifier for notifying the remote control terminal that the received instruction is from a resident other than the authorized person when the authorized person determiner determines that the received instruction is from the resident other than the authorized person;
   an authorization necessity information memory for storing authorization necessity information indicating, for each type of control of the equipment, whether or not the control requires authorization from the authorized person; and
   an authorization necessity determiner for determining whether or not authorization from the authorized person is necessary for control indicated by the control signal received, with reference to the authorization necessity information;
   wherein when the authorization necessity determiner determines that authorization is unnecessary, the equipment controller controls the equipment based on the received control signal, without waiting for the received instruction from the authorized person, and
   wherein when the authorization necessity determiner determines that authorization is necessary, the equipment controller controls the equipment based on the received control signal only when the received instruction is from the authorized person.

2. The equipment control device according to claim 1, wherein the authorization receiver displays on a touch panel a remote control authorization screen indicating contents of control indicated by the control signal received, for receiving the authorized instruction from the authorized person.

3. The equipment control device according to claim 1, wherein the authorized person determiner determines whether or not the received instruction is from the authorized person based on a password input by a resident.

4. The equipment control device according to claim 1, wherein the authorized person determiner determines whether or not the received instruction is from the authorized person based on biological information of a resident.

5. The equipment control device according to claim 1, wherein the authorization receiver receives the authorized instruction only from the authorized person by displaying a remote control authorization screen for receiving the authorized instruction only on an operation terminal of the authorized person who is a resident and for whom control is authorized in advance.

6. The equipment control device according to claim 1, wherein
   the equipment controller does not control the equipment based on the received control signal when the authorization receiver has not received the authorized instruction from the resident during a predetermined period of time since the control signal has been received.

7. The equipment control device according to claim 1, wherein the authorization receiver receives the authorized instruction or the non-authorized instruction via an indoor operation terminal connected to the indoor network.

8. An equipment control method for:
receiving a control signal for controlling indoor equipment from a remote control terminal, via a network, the control signal including an authorized person identification;
receiving an authorized instruction or a non-authorized instruction from a resident for control indicated by the control signal received;
determining whether or not a received instruction is from an authorized person who is a resident and for whom control is authorized in advance;
controlling equipment based on the control signal received only when the received instruction is the authorized instruction and is from the authorized person;
transmitting to the remote control terminal authorization result information indicating content of the received instruction;
notifying the remote control terminal that the received instruction is from a resident other than the authorized person when it is determined that the received instruction is from the resident other than the authorized person;
storing authorization necessity information, for each type of control of the equipment, whether or not the control requires authorization from the authorized person; and
determining whether or not authorization from the authorized person is necessary for control indicated by the control signal received, with reference to the authorization necessity information;
wherein when it is determined that authorization is unnecessary, controlling the equipment based on the received control signal, without waiting for the received instruction from the authorized person, and
wherein when it is determined that authorization is necessary, controlling the equipment based on the received control signal only when the received instruction is from the authorized person.

9. A non-transitive computer readable storage medium recording a program that causes a computer to function as:

a control signal receiver for receiving a control signal for controlling indoor equipment from a remote control terminal, via a network, the control signal including an authorized person identification;
an authorization receiver for receiving an authorized instruction or a non-authorized instruction from a resident, for control indicated by the control signal received;
an authorized person determiner for determining whether or not a received instruction is from an authorized person who is a resident and for whom control is authorized in advance;
an equipment controller for controlling the indoor equipment based on the control signal received, only when the received instruction is the authorized instruction and is from the authorized person;
an authorization result transmitter for transmitting to the remote control terminal authorization result information indicating content of the received instruction;
an unauthorized person notifier for notifying the remote control terminal-that the received instruction is from a resident other than the authorized person when the authorized person determiner determines that the received instruction is from the resident other than the authorized person;
an authorization necessity information memory for storing authorization necessity information indicating, for each type of control of the equipment, whether or not the control requires authorization from the authorized person; and
an authorization necessity determiner for determining whether or not authorization from the authorized person is necessary for control indicated by the control signal received, with reference to the authorization necessity information;
wherein when the authorization necessity determiner determines that authorization is unnecessary, the equipment controller controls the equipment based on the received control signal, without waiting for the received instruction from the authorized person, and
wherein when the authorization necessity determiner determines that authorization is necessary, the equipment controller controls the equipment based on the received control signal only when the received instruction is from the authorized person.

* * * * *